United States Patent
Haroun

(10) Patent No.: US 10,622,694 B2
(45) Date of Patent: Apr. 14, 2020

(54) DIELECTRIC WAVEGUIDE RADAR SIGNAL DISTRIBUTION

(71) Applicant: Texas Instruments Incorporated, Dallas, TX (US)

(72) Inventor: Baher S. Haroun, Allen, TX (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 638 days.

(21) Appl. No.: 14/969,392

(22) Filed: Dec. 15, 2015

(65) Prior Publication Data

US 2016/0240907 A1 Aug. 18, 2016

Related U.S. Application Data

(60) Provisional application No. 62/115,499, filed on Feb. 12, 2015.

(51) Int. Cl.

| | |
|---|---|
| *G01S 7/03* | (2006.01) |
| *H01P 3/16* | (2006.01) |
| *H01Q 1/32* | (2006.01) |
| *G01S 13/931* | (2020.01) |
| *G01S 13/93* | (2020.01) |

(52) U.S. Cl.
CPC ........... *H01P 3/16* (2013.01); *G01S 7/032* (2013.01); *G01S 7/034* (2013.01); *G01S 13/931* (2013.01); *H01Q 1/3233* (2013.01); *G01S 2013/9375* (2013.01); *G01S 2013/9378* (2013.01); *G01S 2013/9385* (2013.01); *G01S 2013/9389* (2013.01)

(58) Field of Classification Search
CPC .. H01P 3/16; H01P 3/165; H01Q 1/32; H01Q 1/3233; H01Q 1/3283; H01Q 1/3291; G01S 7/032; G01S 7/034; G01S 13/93; G01S 13/931; G01S 2013/9314; G01S 2013/9317; G01S 2013/9371; G01S 2013/9375; G01S 2013/9378; G01S 2013/9385; G01S 2013/9389
See application file for complete search history.

(56) References Cited

U.S. PATENT DOCUMENTS

| | | | |
|---|---|---|---|
| 7,830,989 B2 * | 11/2010 | Mohamadi | G01S 7/032 343/850 |
| 2003/0146826 A1 * | 8/2003 | Viana | G01S 13/87 340/435 |
| 2004/0075603 A1 * | 4/2004 | Kodama | G01S 7/4008 342/70 |

(Continued)

OTHER PUBLICATIONS

"Rat-race Coupler" Wikipedia, pp. 1-2, available at https://en.wikipedia.org/wiki/Rat-race_coupler on Oct. 20, 2015.

(Continued)

*Primary Examiner* — Timothy A Brainard
(74) *Attorney, Agent, or Firm* — Brian D. Graham; Charles A. Brill; Frank D. Cimino

(57) ABSTRACT

A system is provided for transmitting sub-terahertz electromagnetic radio frequency (RF) signals using a dielectric waveguide (DWG) having a dielectric core member surrounded by dielectric cladding. Multiple radar signals may be generated by a radar module that is coupled to a vehicle. A set of DWG segments may be used to transport the radar signals to various launching structures placed in various locations of the vehicle.

20 Claims, 9 Drawing Sheets

(56) References Cited

U.S. PATENT DOCUMENTS

| | | | | |
|---|---|---|---|---|
| 2006/0092086 A1* | 5/2006 | Franson | ............... | G01S 7/032 343/767 |
| 2007/0152869 A1* | 7/2007 | Woodington | ........... | G01S 13/48 342/70 |
| 2007/0171137 A1* | 7/2007 | Mierzwa | ............... | H01Q 1/288 343/713 |
| 2008/0088499 A1* | 4/2008 | Bonthron | .............. | G01S 13/931 342/104 |
| 2010/0225547 A1* | 9/2010 | Lan | ..................... | H01Q 1/3283 343/713 |
| 2011/0279304 A1* | 11/2011 | Yonemoto | ............ | B60Q 1/0023 342/52 |
| 2013/0050012 A1* | 2/2013 | Jungmaier | .............. | G01S 7/034 342/118 |
| 2014/0191895 A1* | 7/2014 | Binzer | ................. | G01S 13/878 342/59 |
| 2014/0240187 A1* | 8/2014 | Herbsommer | ........... | H01P 3/16 343/785 |
| 2014/0280187 A1 | 9/2014 | Herbsommer et al. | | |
| 2014/0287701 A1 | 9/2014 | Herbsommer et al. | | |
| 2015/0295297 A1 | 10/2015 | Cook | | |
| 2016/0112094 A1* | 4/2016 | Stuckman | ................ | H01P 5/12 375/257 |

OTHER PUBLICATIONS

"Circulator", Wikipedia, pp. 1-4, available at https://en.wikipedia.org/wiki/Circulator on Oct. 20, 2015.

Juan Alejandro Herbsommer, "Dielectric Waveguide Socket", U.S. Appl. No. 14/865,552, filed Sep. 25, 2015, pp. 1-34.

\* cited by examiner

DIELECTRIC WAVEGUIDE RADAR SIGNAL DISTRIBUTION

CLAIM OF PRIORITY UNDER 35 U.S.C. 119 ((A) FOREIGN, (E) PROVISIONAL)

The present application claims priority to and incorporates by reference U.S. Provisional Application No. 62/115,499, filed Feb. 12, 2015, entitled "DIELECTRIC (PLASTIC) WAVEGUIDE RADAR SIGNAL SURROUND DISTRIBUTION".

FIELD OF THE INVENTION

This invention generally relates to vehicular radar systems, and in particular to the use of dielectric waveguides to distribute radar signals throughout a vehicle.

BACKGROUND OF THE INVENTION

A new class of safety systems, referred to as advanced driver assistance systems (ADAS), has been introduced into automobiles to reduce human operation error. These systems are enabled by smart sensors based primarily on millimeter-wave automotive radars. The proliferation of such assistance systems, which may provide functionality such as rear-view facing cameras, electronic stability control, and vision-based pedestrian detection systems, has been enabled in part by improvements in microcontroller and sensor technologies. Enhanced embedded radar-based solutions are enabling complementary safety features for ADAS designers.

In an automotive radar system, one or more radar sensors may be used to detect obstacles around the vehicle and the speeds of the detected objects relative to the vehicle. A processing unit in the radar system may determine the appropriate action needed, e.g., to avoid a collision or to reduce collateral damage, based on signals generated by the radar sensors. Current automotive radar systems are capable of detecting objects and obstacles around a vehicle, the position of any detected objects and obstacles relative to the vehicle, and the speed of any detected objects and obstacles relative to the vehicle. Via the processing unit, the radar system may, for example, alert the vehicle driver about potential danger, prevent a collision by controlling the vehicle in a dangerous situation, take over partial control of the vehicle, or assist the driver with parking the vehicle.

Currently, an integrated circuit (IC) containing a radar transceiver may be placed at each location in a vehicle where a radar signal is needed. For example, three ICs may be located on the front of a vehicle (middle and both corners) to provide forward looking coverage. Additional ICs may be deployed on the sides and rear of the vehicle.

Many parking assist systems currently rely on ultrasonic transducers. Ultrasonic transducers require a hole to be provided in the bumper or fender of the vehicle for each transducer. A typical system includes three or four transducers at the rear of a vehicle, which require three or four unsightly holes in the rear body part of the vehicle.

In electromagnetic and communications engineering, the term waveguide may refer to any linear structure that conveys electromagnetic waves between its endpoints. The original and most common meaning is a hollow metal pipe used to carry radio waves. This type of waveguide is used as a transmission line for such purposes as connecting microwave transmitters and receivers to their antennas, in equipment such as microwave ovens, radar sets, satellite communications, and microwave radio links.

A dielectric waveguide employs a solid dielectric core rather than a hollow pipe. A dielectric is an electrical insulator that can be polarized by an applied electric field. When a dielectric is placed in an electric field, electric charges do not flow through the material as they do in a conductor, but only slightly shift from their average equilibrium positions causing dielectric polarization. Because of dielectric polarization, positive charges are displaced toward the field and negative charges shift in the opposite direction. This creates an internal electric field which reduces the overall field within the dielectric itself. If a dielectric is composed of weakly bonded molecules, those molecules not only become polarized, but also reorient so that their symmetry axis aligns to the field. While the term "insulator" implies low electrical conduction, "dielectric" is typically used to describe materials with a high polarizability; which is expressed by a number called the relative permittivity ($\varepsilon k$). The term insulator is generally used to indicate electrical obstruction while the term dielectric is used to indicate the energy storing capacity of the material by means of polarization.

Permittivity is a material property that expresses a measure of the energy storage per unit meter of a material due to electric polarization ($J/V^2)/(m)$. Relative permittivity is the factor by which the electric field between the charges is decreased or increased relative to vacuum. Permittivity is typically represented by the Greek letter $\varepsilon$. Relative permittivity is also commonly known as dielectric constant.

Permeability is the measure of the ability of a material to support the formation of a magnetic field within itself in response to an applied magnetic field. Magnetic permeability is typically represented by the Greek letter $\mu$.

The electromagnetic waves in a metal-pipe waveguide may be imagined as travelling down the guide in a zig-zag path, being repeatedly reflected between opposite walls of the guide. For the particular case of a rectangular waveguide, it is possible to base an exact analysis on this view. Dielectric waveguide guides the wave similar to a metal waveguide but provides a lower loss and more flexible alternatives. A multi dielectric waveguide with a metal shield is also possible.

BRIEF DESCRIPTION OF THE DRAWINGS

Particular embodiments in accordance with the invention will now be described, by way of example only, and with reference to the accompanying drawings.

Figure 1:
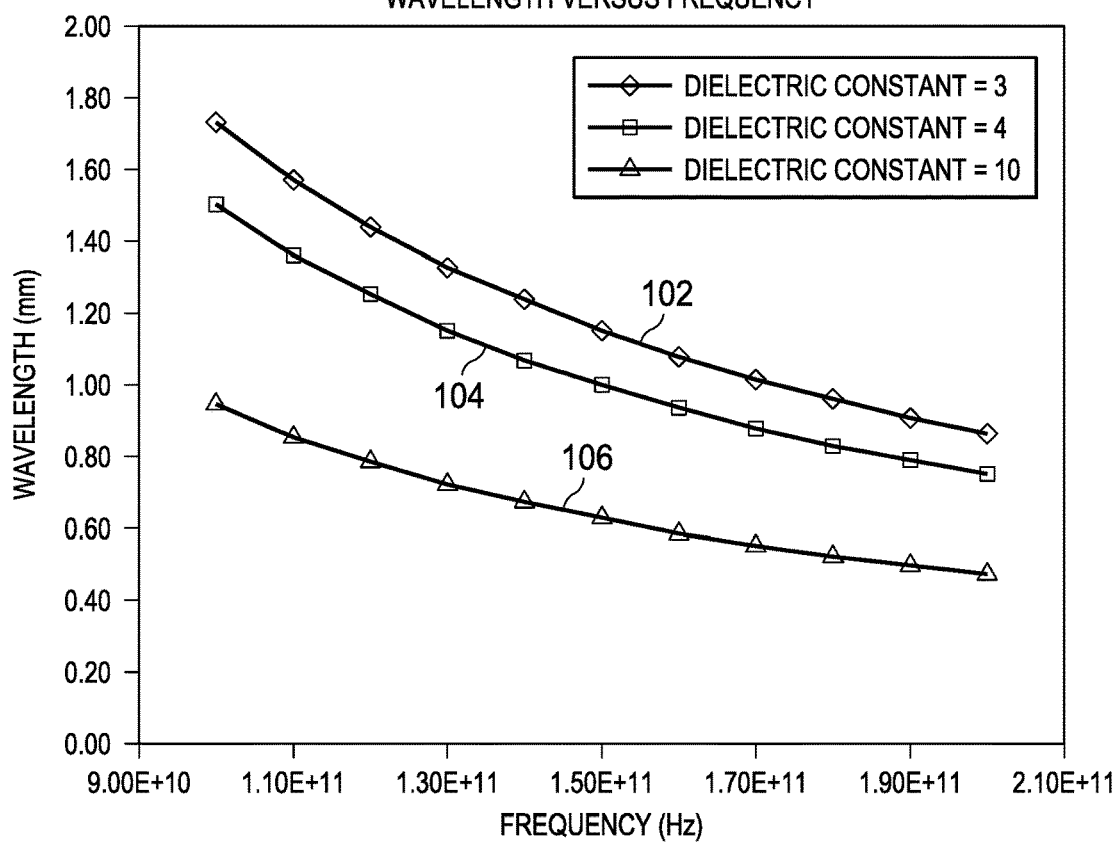
FIG. 1 is a plot of wavelength versus frequency through materials of various dielectric constants.

Other features of the present embodiments will be apparent from the accompanying drawings and from the detailed description that follows.

DETAILED DESCRIPTION OF EMBODIMENTS OF THE INVENTION

Specific embodiments of the invention will now be described in detail with reference to the accompanying figures. Like elements in the various figures are denoted by like reference numerals for consistency. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

A dielectric waveguide (DWG) may be used as a medium to communicate chip to chip in a system or system to antenna, for example. Using a DWG cable to distribute radar signals between a radar module and radar antennas may provide a low cost interconnect solution. Embodiments of this disclosure provide a way to interface multiple radar antennas to a single radar module, as will be described in more detail below.

The low cost of DWG components may allow a parking assist system to be implemented using a single radar module and multiple radar antennas interconnected via DWGs at a price that is competitive with an ultrasound system. A single radar IC in such a system may provide 180 degree coverage across the rear of a vehicle, for example. A radar based parking assist system does not require unsightly holes in the vehicles body components. Ultrasonic parking assist systems are limited to a coverage distance of about 10 m, while radar systems operating in the 77-81 GHz band may easily extend coverage to a distance of 40 m or more with high resolution imaging.

The wavelengths of radar signals are short enough that signal lines that exceed a short distance may act as an antenna and signal radiation may occur; the lines would also be very lossy at such high frequencies due the skin effect losses of the metal lines, therefore it is not practical to distribute radar signals over a distance using conventional conductive wires. FIG. 1 is a plot of wavelength versus frequency through materials of various dielectric constants. As illustrated by plot 102 which represents a material with a low dielectric constant of 3, such as a typical printed circuit board, a 100 GHz signal will have a wavelength of approximately 1.7 mm. Thus, a signal line that is only 1.7 mm in length may act as a full wave antenna and radiate a significant percentage of the signal energy. In fact, even lines of $\lambda/10$ are good radiators, therefore a line as short as 170 um in a printed circuit board may act as a good antenna at this frequency. Wavelength typically decreases in materials with higher dielectric constants, as illustrated by plot 104 for a dielectric constant of 4 and plot 106 for a dielectric constant of 10, for example.

Waves in open space propagate in all directions, as spherical waves. In this way they lose their power proportionally to the square of the distance; that is, at a distance R from the source, the power is the source power divided by R^2. A low-loss wave guide may be used to transport high frequency signals over relatively long distances. The waveguide confines the wave to propagation in one dimension, so that under ideal conditions the wave loses no power while propagating. Electromagnetic wave propagation along the axis of the waveguide is described by the wave equation, which is derived from Maxwell's equations, and where the wavelength depends upon the structure of the waveguide, and the material within it (air, plastic, vacuum, etc.), as well as on the frequency of the wave. Commonly-used waveguides are only of a few categories. The most common kind of waveguide is one that has a rectangular cross-section, one that is usually not square. It is common for the long side of this cross-section to be twice as long as its short side. These are useful for carrying electromagnetic waves that are horizontally or vertically polarized.

A waveguide configuration may have a core member made from dielectric material with a high dielectric constant and be surrounded with a cladding made from dielectric material with a lower dielectric constant. While theoretically, air could be used in place of the cladding, since air has a dielectric constant of approximately 1.0, any contact by humans, or other objects may introduce serious discontinuities that may result in signal loss or corruption. Therefore, typically free air does not provide a suitable cladding.

For the exceedingly small wavelengths encountered for sub-THz radio frequency (RF) signals, dielectric waveguides perform well and are much less expensive to fabricate than hollow metal waveguides. Furthermore, a metallic waveguide has a frequency cutoff determined by the cross-sectional size of the waveguide. Below the cutoff frequency there is no propagation of the electromagnetic field. Dielectric waveguides may have a wider range of operation without a fixed cutoff point. However, a purely dielectric waveguide may be subject to interference caused by touching by fingers or hands, or by other conductive objects. Metallic waveguides confine all fields and therefore do not suffer from EMI (electromagnetic interference) and cross-talk issues; therefore, a dielectric waveguide with a metallic cladding may provide significant isolation from external sources of interference.

US Patent Application publication number US 2014-0287701 A1, filed Apr. 1, 2013, entitled "Integrated Circuit with Dipole Antenna Interface for Dielectric Waveguide" is incorporated by reference herein. Various configurations of dielectric waveguides (DWG) and interconnect schemes are described therein. Various antenna configurations for launching and receiving radio frequency signals to/from a DWG are also described therein.

US Patent Application publication number US 2014-0240187 A1, filed Apr. 1, 2013, entitled "Dielectric Waveguide with Non-planar Interface Surface" is incorporated by reference herein. Various configurations of DWG sockets and interfaces are described therein.

Fabrication of DWGs using 3D printing is described in more detail in US Patent Application US 2015-0295297 A1, filed Sep. 26, 2014, "Metallic Waveguide with Dielectric Core," is incorporated by reference herein.

U.S. patent application publication Ser. No. 14/865,552, filed Sep. 25, 2015, entitled "Dielectric Waveguide Socket" is incorporated by reference herein. Various configurations of DWG sockets and launching structures are described therein.

Figure 2:
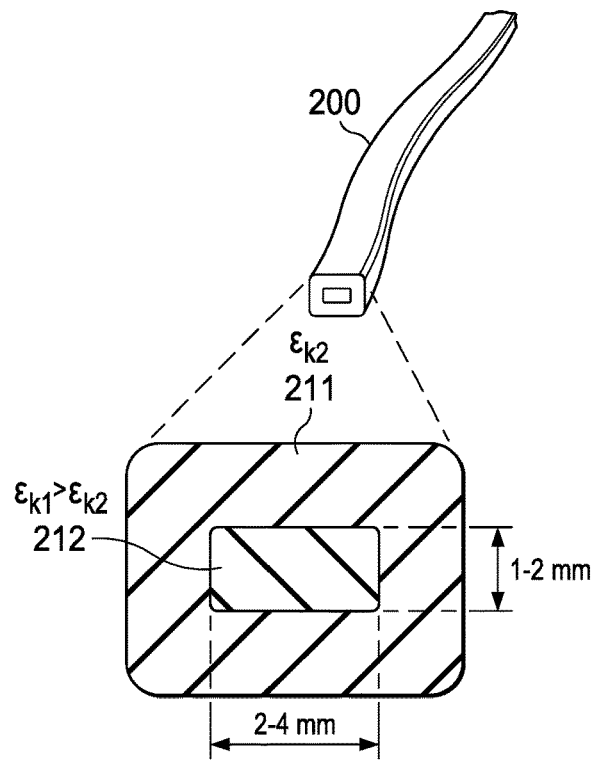
FIGS. 2 and 3 are an illustrations of an example dielectric waveguide (DWG)

FIG. 2 illustrates a DWG 200 that is configured as a thin ribbon of a core dielectric material 212 surrounding by a second dielectric cladding material 211. The core dielectric material has a dielectric constant value $\varepsilon k1$, while the cladding has a dielectric constant value of $\varepsilon k2$, where $\varepsilon k1$ is greater than $\varepsilon k2$. In this example, a thin rectangular ribbon of the core material 212 is surrounded by the cladding material 211. For sub-terahertz signals, such as in the range of 130-150 gigahertz, a core dimension of approximately 0.5 mm×1.0 mm works well. Radar signals used in ADAS are typically in the 76-81 GHz band. A DWG with a core that is approximately 0.5-1.0 mm×2.0 mm works well for this frequency band. For a lower frequency parking assist system in the 24 GHz range, a DWG with a core that is approximately 3 mm×6 mm would work well.

Figure 3:
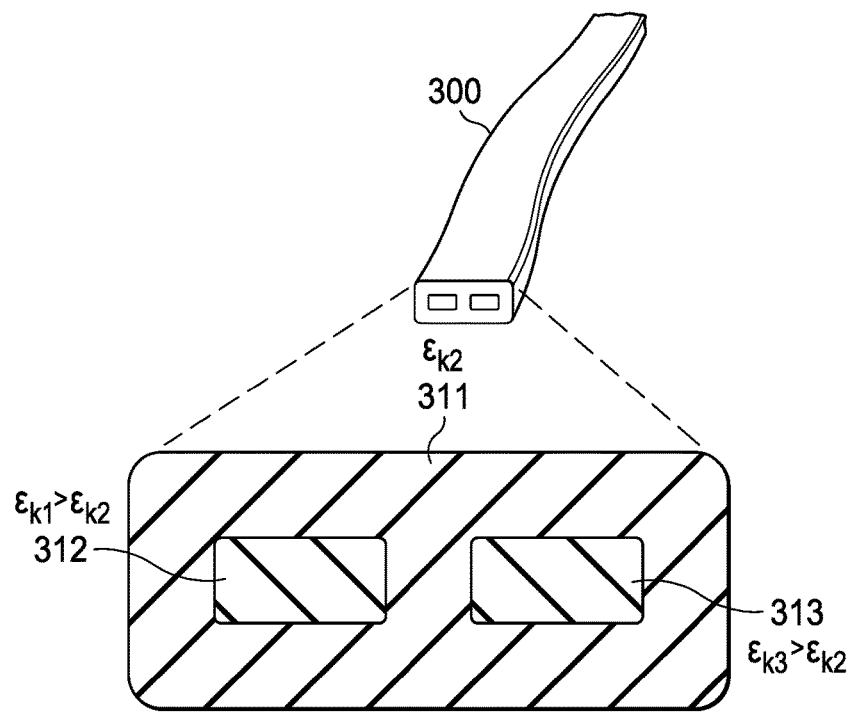

FIG. 3 is an illustration of an exemplary DWG 300 that has two cores 312, 313 surrounded by a common cladding 311. Core 313 may have a dielectric constant vale εk3 that is different from the dielectric value εk1 of core 312, for example, or they both have the same dielectric constant value.

While two DWG configurations are illustrated by FIGS. 2, 3, other configurations may include additional numbers of cores, conductive wires in addition to the dielectric cores, etc. While rectangular cores are illustrated herein, other embodiments of this disclosure may use cores having other shapes, such as square, round or oval, for example. Additional layers of dielectric material or conductive material may be used to provide mechanical protection or to reduce signal loss or interference, for example.

Flexible DWG cables may be fabricated using standard manufacturing materials and fabrication techniques. These cable geometries may be built using techniques such as: drawing, extrusion, or fusing processes, which are all common-place to the manufacture of plastics.

Figure 4:
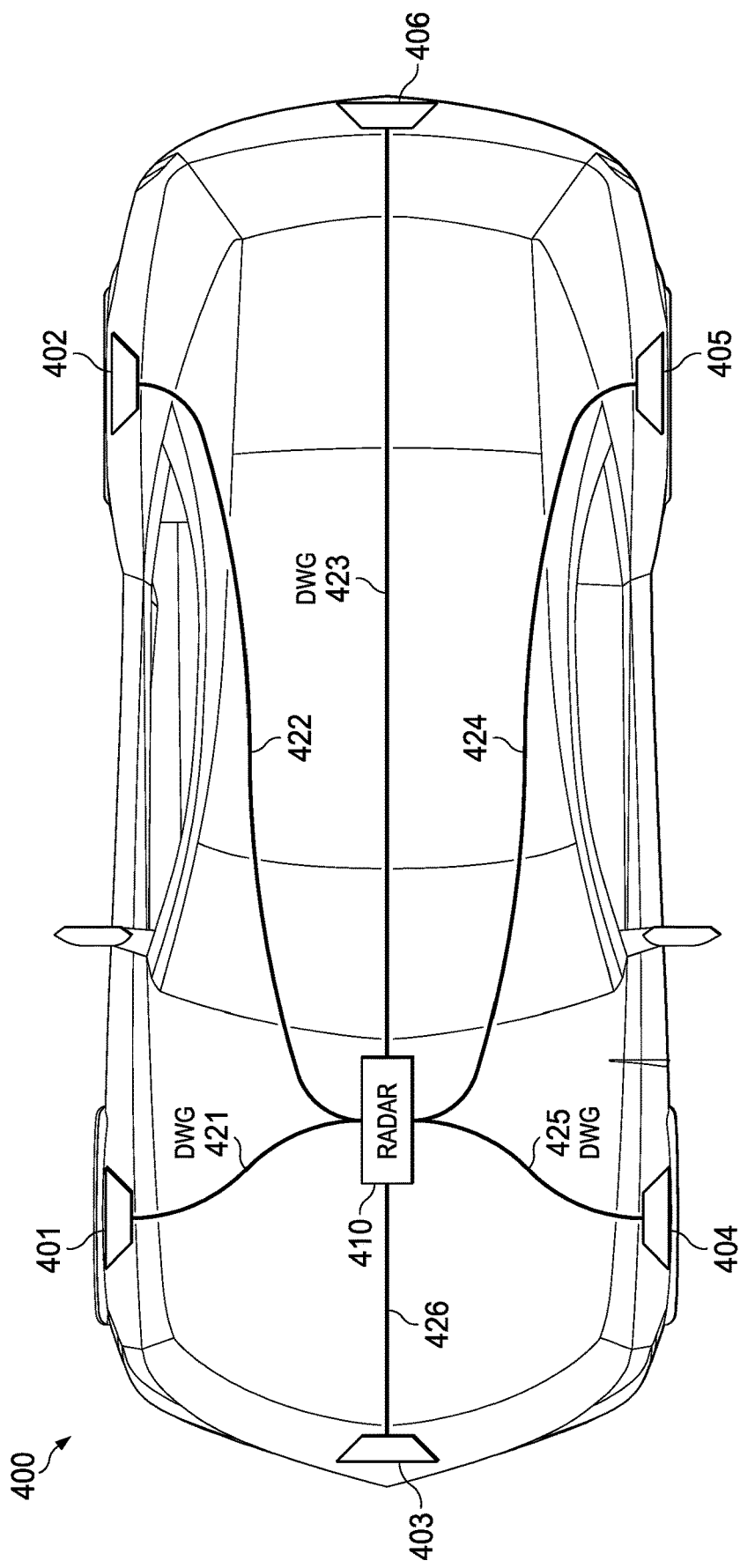

FIG. 4 is an illustration of an automobile 400 equipped with multiple radar antennas 401-406 coupled to a single radar module 410 via multiple DWG cables 421-426. Long range radar (LRR) may be used for applications such as automatic cruise control. Medium rang radar (MRR) typically use a narrow beam and must detect high relative velocities. MRR may be used for applications such as: braking, intersection detection, pedestrian detection, and reverse cross traffic alerts, for example. Short range radar (SRR) typically uses a wide beam with large angular separation to provide good distance resolution. SRR may be used for applications such as: parking, lane change, and blind spot monitoring, and pre-crash alerts, for example.

By using DWG (plastic) links 421-426, a single RF Radar Chip 410 may be used, for all six radar antennas. This allows reuse of many RF/Analog/Baseband/DSP circuits for all channels. Losses in the DWG links are minimal, typically a few db due to coupling losses, and may be compensated by increased sensitivity and output power from the radar chip.

Figure 5:
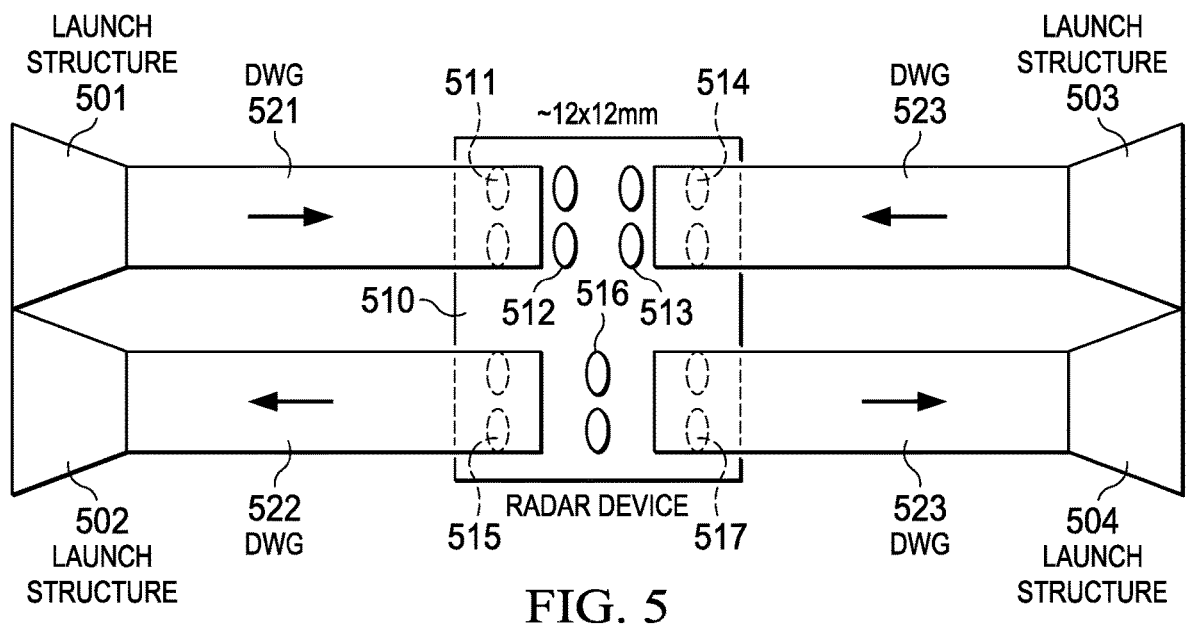
FIGS. 4-7 are illustrations of an exemplary radar distribution system within a vehicle using DWGs.

FIG. 5 is an illustration of an exemplary radar system having a single radar transceiver integrated circuit (IC), multiple radar launch structures 501-504, and interconnections between the radar IC and the launch structure via DWGs 521-524. In this example, radar IC has four receiver channels 511-514 and three transmitter channels 515-517. An example radar transceiver will be described in more detail later.

In this example, each launch structure 501-503 is coupled to radar IC 510 via a dedicated DWG. For example, transmit antenna 502 is coupled to a transmit port 515 on IC 510 via DWG 522. Similarly, receive antenna 501 is coupled to a receive port 511 on IC 510 via DWG 521.

Figure 6:
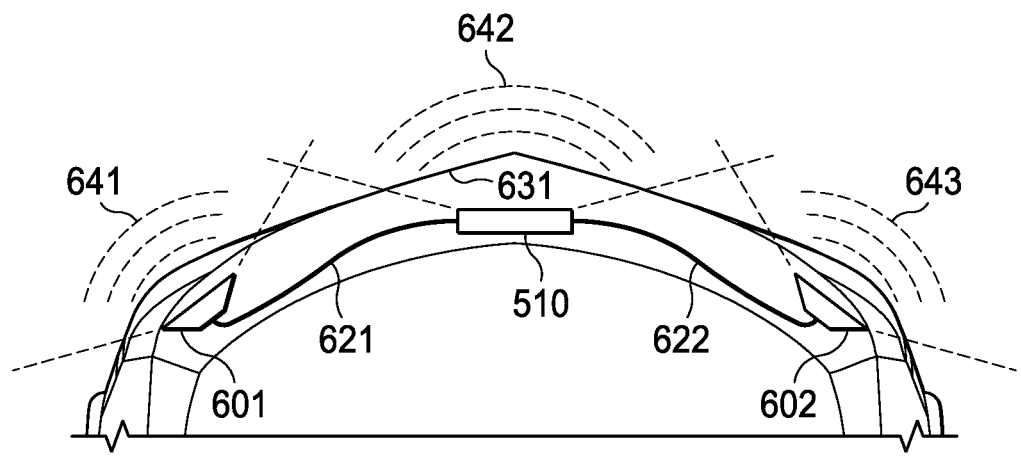

FIG. 6 is a pictorial illustration of a bumper 631 of a vehicle with a parking assist radar system mounted on the bumper. In this example, a radar module such as module 510 from FIG. 5 is mounted such that receiver ports 512, 513 and transmit port 516 are located adjacent bumper so that a radar signal may be transmitted directly through the bumper 631 by device 510, as indicated at 642. Radar launching structures 601 and 602 are coupled to respective ports on device 510 using DWGs 621 and 622 and are configured to transmit radar signals directly through the bumper as indicated at 641 and 642.

Typically, a radar antenna may form a useful radiation pattern over an area of approximately +/−60-80 degrees. Thus, in the example of FIG. 6, a single radar IC can cover the entire 180 degree view in front or rear of a vehicle using multiple launching structures that are interconnected using inexpensive DWGs. As mentioned above, holes through the bumper for each antenna are not required, as are required for an ultrasound transducer.

Figure 7:
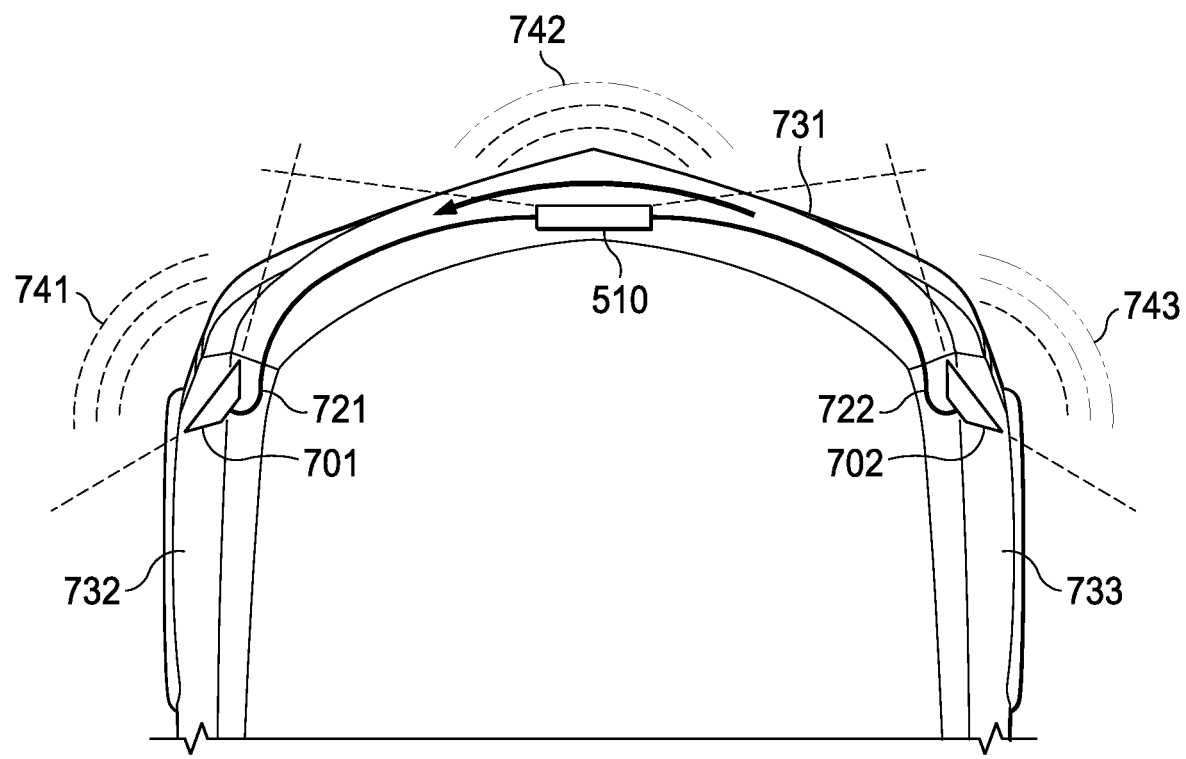

FIG. 7 is a pictorial illustration of a bumper 731 of a vehicle with a parking assist radar system mounted on the bumper. In this example, a radar module such as module 510 from FIG. 5 is mounted such that receiver ports 512, 513 and transmit port 516 are located adjacent bumper so that a radar signal may be transmitted directly through the bumper 731 by device 510, as indicated at 742. Radar launching structures 701 and 702 are coupled to respective ports on device 510 using DWGs 721 and 722 and are configured to transmit radar signals directly through the fenders 732, 733 as indicated at 741 and 742. In this example, beam steering may be used to widen the radiation pattern 742.

In this manner, more that a 180 degree view of the front or rear of a vehicle may be obtained using multiple launching structures that are interconnected using inexpensive DWGs. As mentioned above, holes through the bumper and fender for each antenna are not required, as are required for an ultrasound transducer.

Figure 8:
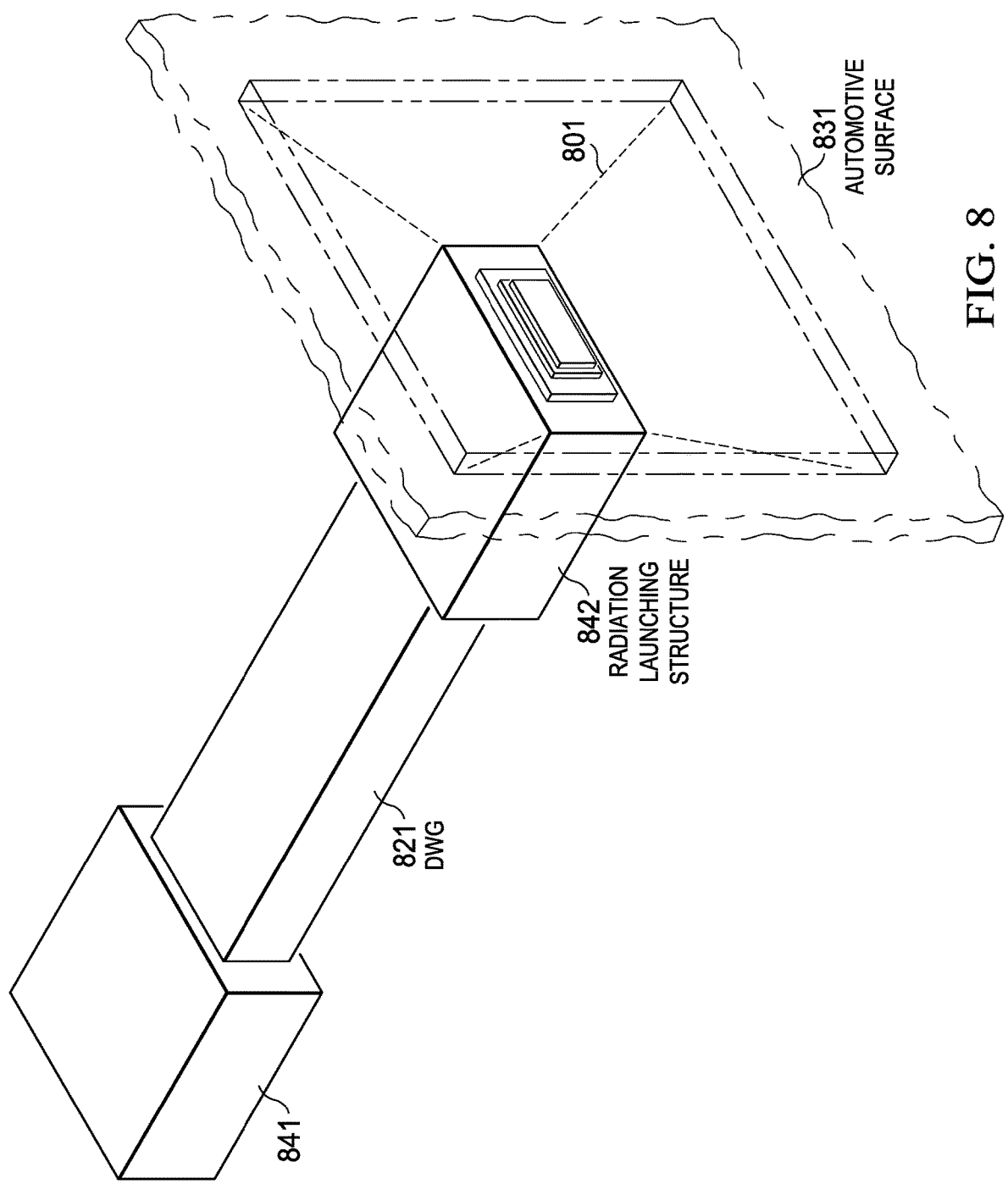
FIG. 8 illustrates placement of a radar antenna adjacent a vehicle body part.

FIG. 8 illustrates placement of a radar antenna 801 adjacent a vehicle body part 831. In this example, body part 831 may be a bumper, fender, door panel, etc. As mentioned before, there is no need to provide a hole through the panel since radar radiation is capable of penetrating most materials used for vehicle construction.

Radiation launching structure 801 may be any of several types of horn antennas, dipole antenna, Vivaldi antenna, etc. that are now known or later developed. Typically, the launching structure may be placed in tight contact with an inner surface of the panel, as illustrated here, or spaced away from the inner surface of the panel. When the launching structure is spaced away from the body part, there may be some signal reflection that may require compensation, for example.

DWG cable 821 may be coupled to launching structure 801 using a connector device 842. Similarly, connecter device 841 may be provided to allow coupling of DWG 841 to another DWG cable or to a radar module, as described above. Alternatively, launching structure 801 may be formed as a permanent part of the end of DWG 821, for example.

Figure 9:
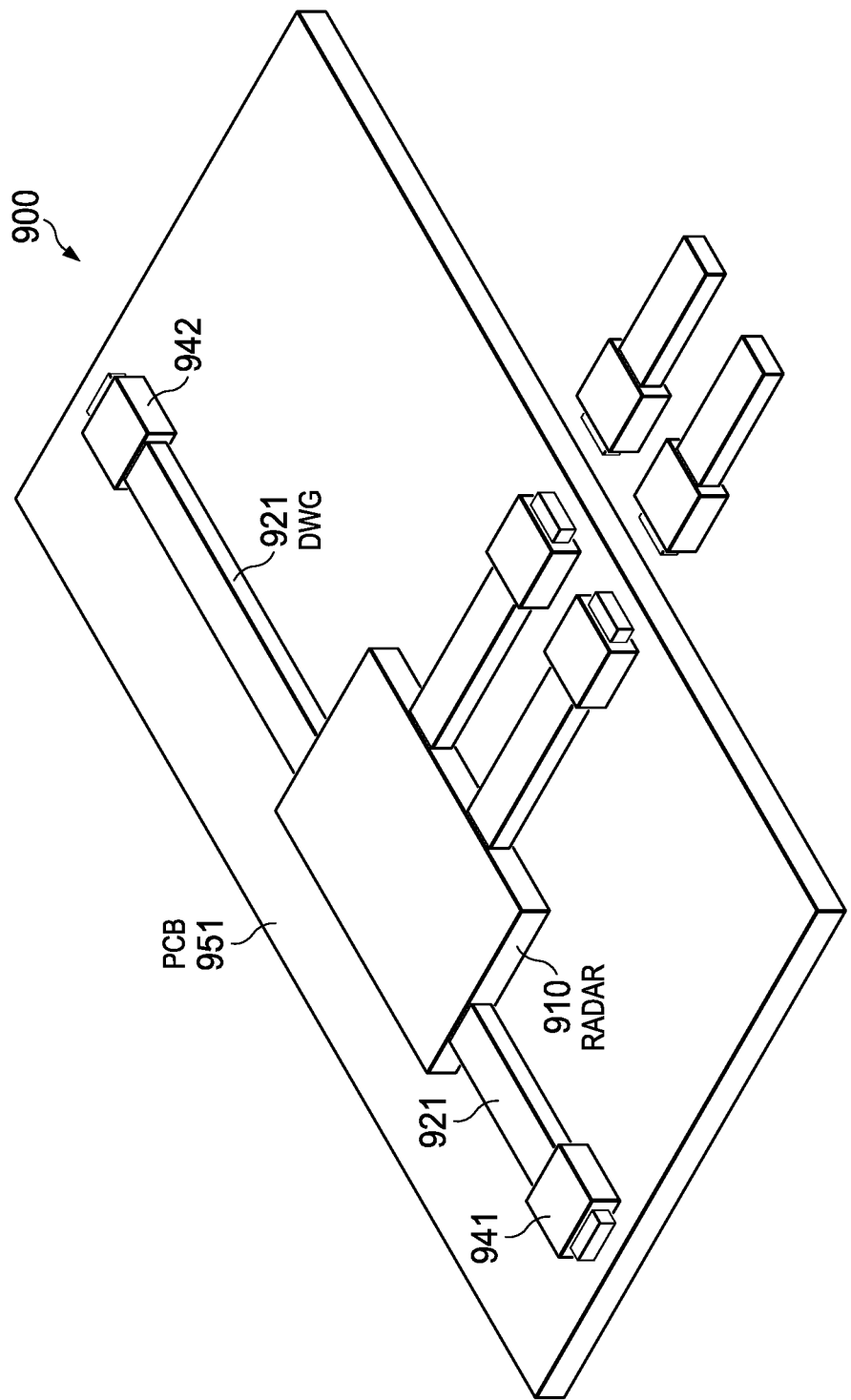
FIGS. 9-10 are illustrations of a radar module for use in a vehicle.

FIG. 9 is an illustration of an example radar module 900 for use in a vehicle. In this example, a radar SOC 910 is a known or later developed radar SOC, such as SOC 510 of FIG. 5, for example. SOC 910 may be mounted on a substrate 951, such as a printed circuit board or other known or later developed substrate. DWG segments, such as DWG 921, 922 may be coupled to radar ports on SOC 910. The ends of the DWG segments may be terminated in connectors, such as connector device 941, 942, to allow easy coupling to other DWG segments that are connected to various radar launching structures, as discussed above in more detail.

There may be additional ICs mounted on substrate 951 to control SOC 910 and to provide ADAS functional operations. Communication interfaces may be provided to communication with other systems in the vehicle, such as braking systems, steering, engine control, etc.

This substrate may range from an integrated circuit (IC) die, a substrate in a multi-chip package, a printed circuit board (PCB) on which several ICs are mounted, etc., for example. Substrate 951 may be any commonly used or later developed material used for electronic systems and packages, such as: silicon, ceramic, Plexiglas, fiberglass, plastic, etc., for example. The substrate may be as simple as paper, for example. The entire module 900 may be encapsulated or otherwise enclosed to provide mechanical and climatic protection.

Figure 10:
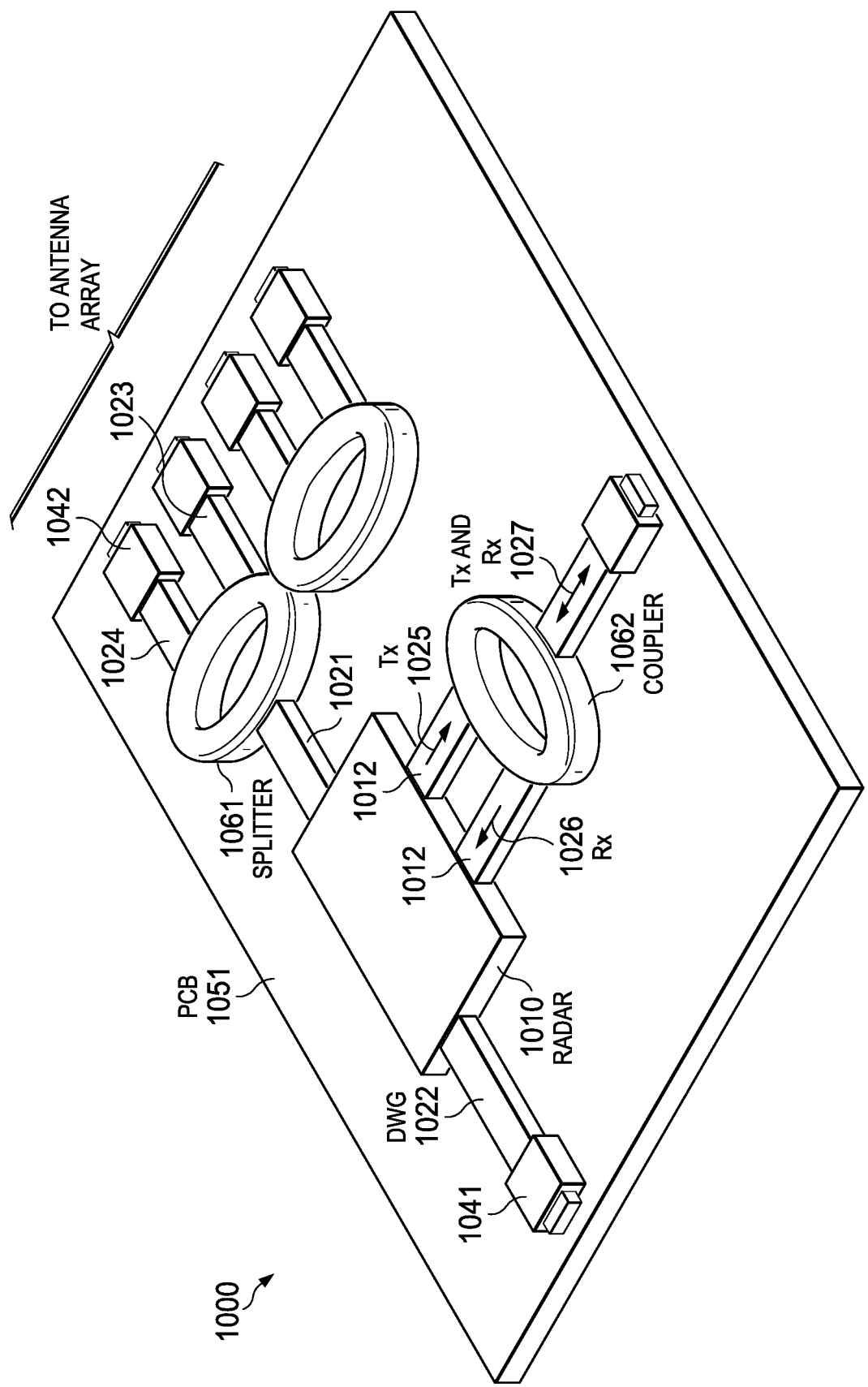

FIG. 10 is an illustration of another example radar module 1000 for use in a vehicle. In this example, a radar SOC 1010 is a known or later developed radar SOC, such as SOC 510 of FIG. 5, for example. SOC 1010 may be mounted on a substrate 1051, such as a printed circuit board or other known or later developed substrate. DWG segments, such as DWG 1021, 1022, 1025, 1026 may be coupled to radar ports on SOC 1010. The ends of the DWG segments may be terminated in connectors, such as connector device 1041, 1042, to allow easy coupling to other DWG segments that are connected to various radar launching structures, as discussed above in more detail.

In this example, a toroidal splitter 1061 and/or a toroidal coupler 1062 may be used to provide DWG interconnect options. For example, DWG segment 1021 may be coupled to a transmitter port on SOC 1010. Toroidal splitter 1061 may be used to divide a single radar signal coming from SOC 1010 into two signals. Additional splitters may be added to provide additional output radar signals. Toroidal splitter 1061 may be constructed using well known principles. For example, a known "rat race splitter" operates by placing output ports at precise wavelength locations on the toroidal ring. Other known or later developed splitters may be used to increase the number of outputs or to combine a number of received signals into a single port on SOC 1010.

Similarly, a toroidal coupler 1062 may be used to combine a radar signal coming from a transmitter port 1012 on DWG segment 1025 with a received signal being provided to a receiver port 1012 via DWG segment 1026 into a bidirectional signal on DWG segment 1027 that may then be connected to a single radar launching structure for both transmission and reception. Circular/bidirectional couplers are also well known and may rely on accurate placement of the various ports on the toroidal structure.

DWG structures such as splitter 1061, coupler 1062, and DWG segments 1021-1027 may all be fabricated directly on substrate 1051 using various techniques, such as 3D printing, for example.

There may be additional ICs mounted on substrate 1051 to control SOC 1010 and to provide ADAS functional operations. Communication interfaces may be provided to communication with other systems in the vehicle, such as braking systems, steering, engine control, etc.

The entire module 1000 may be encapsulated or otherwise enclosed to provide mechanical and climatic protection.

Figure 11:
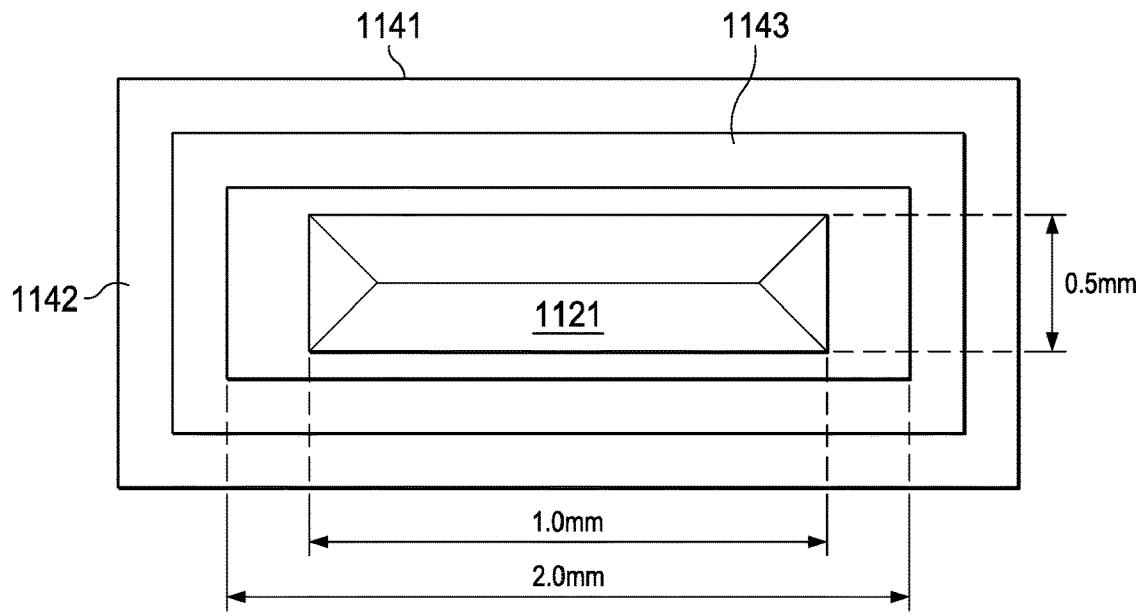
FIGS. 11-12 are examples of DWG connectors.

FIG. 11 is an end view of an example simple DWG connector 1141 that is suitable for radar signals in the 70-110 GHz band. At this frequency, a tolerance of approximately 50 μm is permissible. In this example, the core member 1121 of a DWG is attached to a housing 1142 that has a cavity region 1143 to accept a mating end of another DWG segment. In this example, the end of core member 1121 is formed in a pyramid shape to improve signal coupling with a matching recession in the mating segment.

Figure 12:
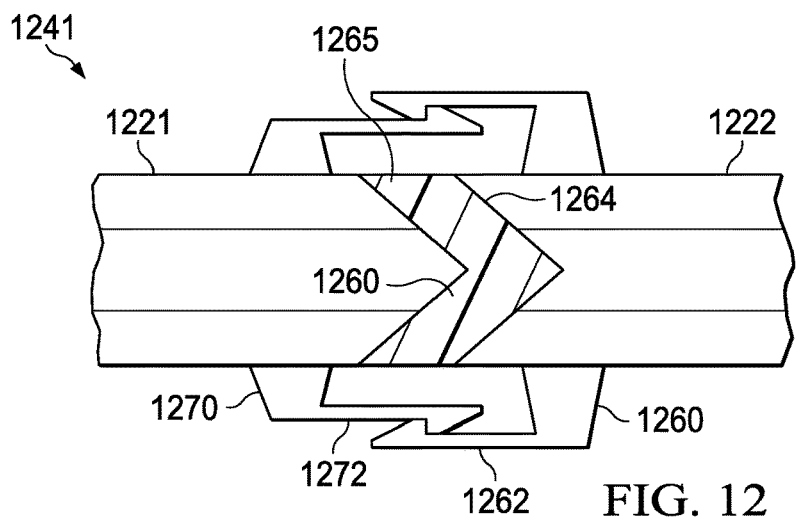

FIG. 12 is a more detailed side view of an example connector 1241. In this example, DWGs 1221, 1222 are coupled with a Silicone gap filler material 1265. One piece 1270 of the snap connector is mounted on an end of DWG 1221 to form a plug. Another piece 1260 of the snap connector is mounted on an end of stub DWG 1222. The mounting positions of the snap connector pieces are controlled so that when mated, the deformable gap filler material 1265 is compressed so as to eliminate most, if not all, air from the gap between DWG 1221 and DWG 1222.

As described in more detail in US 2014-0240187, when two dielectric waveguides are coupled together, there is likely to be a gap between the two DWGs. This gap creates an impedance mismatch that may generate significant losses due to radiated energy produced by the impedance mismatch. The extent of the losses depends on the geometry of the gap and the material in the gap. Based on simulations, a square cut butt joint appears to provide a significant impedance mismatch.

Simulations demonstrate that a spearhead shape such as illustrated at 1264 is effective if the taper is done in only two of the sides of the DWG but it is better when the taper is done in the four sides of the DWG to form a pyramidal shape. This taper could also be replaced by a conical shape on four sides or a vaulted shape on two sides, or any other shape that deflects energy back to the DWG from the signal deflected by the opposite side cut.

A spearhead, pyramidal, conical, vaulted or similar type shape provides an interface with a very low insertion loss, is easy to implement, is mechanically self-aligning, and is flexible and robust to small misalignments. These shapes may all be produced using standard manufacturing materials and fabrication techniques.

Material in the Gag

In the examples discussed above, the material filling the gap may be just air, which has a dielectric constant of approximately 1.0. As discussed earlier, the dielectric constant of the core material will typically be in the range of 3-12, while the dielectric constant of the cladding material will typically be in the range of 2.5-4.5. The mismatch impedance is proportional to the difference of the dielectric constant between the DWG and the material inside the gap. This means that even with the geometry of the socket optimized, an air gap between the DWGs is not an optimum configuration. In order to minimize the impedance mismatch, a DWG socket may be designed with a rubbery material 1265 that has a dielectric constant very close to the dielectric constant of the DWG core and cladding. A flexible material is desirable to accommodate and fill all the space in the gap. An example of a rubbery material with dielectric constant 2.5 to 3.5 is Silicone. Other materials with similar characteristics that may be used fall into two types: unsaturated rubber and saturated rubber.

Unsaturated rubbers include: Synthetic polyisoprene, Polybutadiene, Chloroprene rubber, Butyl rubber, Halogenated butyl rubbers, Styrene-butadiene Rubber, Nitrile rubber, Hydrogenated Nitrile Rubbers, etc, for example.

Saturated rubbers include: EPM (ethylene propylene rubber), EPDM rubber (ethylene propylene diene rubber), Epichlorohydrin rubber (ECO) Polyacrylic rubber (ACM, ABR), Silicone rubber (SI, Q, VMQ), Fluorosilicone Rubber (FVMQ, Fluoroelastomers (FKM, and FEPM) Viton, Tecnoflon, Fluorel, Perfluoroelastomers (FFKM) Tecnoflon PFR, Kalrez, Chemraz, Perlast, Polyether block amides (PEBA), Chlorosulfonated polyethylene (CSM), (Hypalon), Ethylene-vinyl acetate (EVA), etc, for example.

While a particular configuration of a connecter is illustrated in FIG. 12, other embodiments may use any number of now known or later designed connector designs to couple together two DWGs while maintaining mechanical alignment and providing enough coupling force to maintain a deforming pressure on the gap filler material.

Typically, the deformable material may be affixed to either the male end of DWG 1221 or to the female end of DWG 1222, for example. The deformable material may be affixed in a permanent manner using glue, heat fusion, or other bonding technology. However, a thinner layer of deformable material may be affixed to the end of both DWG 1221 and to the end of DWG 1222 such that the gap is filled with two layers of deformable material. The male/female orientation of may be reversed in another embodiment.

Connecter 1141 and 1241 may be manufactured using a 3D printing technique to produce a monolithic structure that may then be mounted onto a substrate, such as 951 in FIG. 9 or 1051 in FIG. 10, for example. Alternatively, a 3D printing technique may be used to form DWG socket 1141, 1241 along with stub DWG 1221 directly on a substrate.

Figure 13:
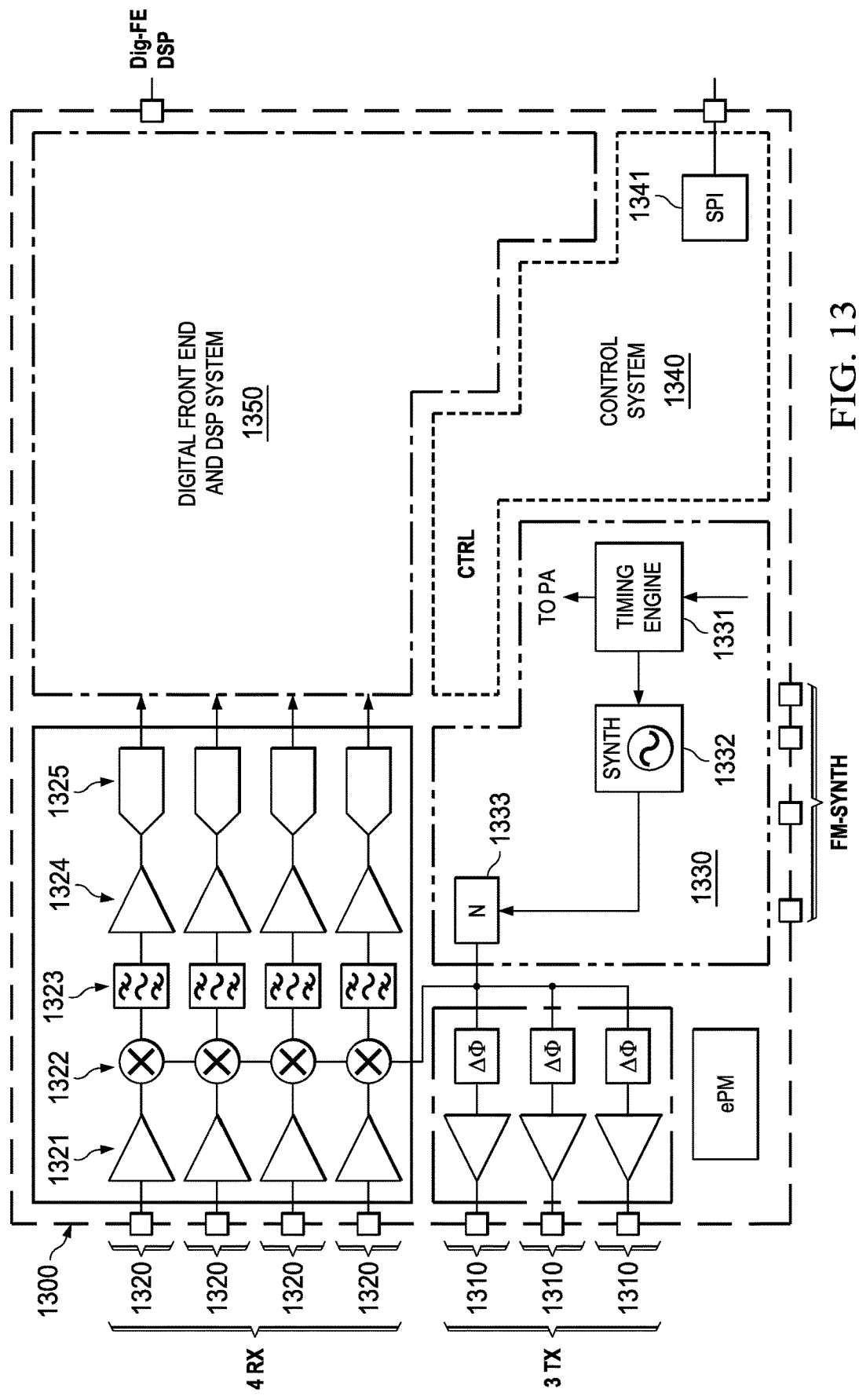
FIG. 13 is a block diagram of a radar system integrated circuit that includes multiple radar transmitters and receivers.

FIG. 13 is a block diagram of an exemplary radar system on a chip (SOC) 1300 that may include multiple radar transmitters and receivers. Radar SOC 1300 may include multiple transmit channels 1310 for transmitting FMCW (frequency modulated continuous wave) RF signals and multiple receive channels 1320 for receiving the reflected transmitted signals. Further, the number of receive channels may be larger than the number of transmit channels. For example, an embodiment of the radar SOC 1300 may have three transmit channels and four receive channels. Other radar SOC embodiments may have more or fewer transmit and receive channels, for example. In some embodiments, one SOC may include a set of receivers and another SOC may include a set of transmitters, for example.

A transmit channel may include a suitable transmitter and antenna. A receive channel includes a suitable receiver and antenna. Further, each of the receive channels 1320 may be identical and include a low-noise amplifier (LNA) 1321 with one or more stages to amplify the received signal, a mixer 1322 to mix the signal generated by the transmission generation circuitry with the received signal to generate an IF signal, a baseband bandpass filter 1323 for filtering the IF signal, a variable gain amplifier (VGA) 1324 for amplifying the filtered IF signal, and an analog-to-digital converter (ADC) 1325 for converting the analog IF signal to a digital IF signal. The mixer serves as a down converter that generates an output signal with a frequency equal to the difference between the frequency of the inputs received from the low-noise amplifier and the transmission generation circuitry, both of which are radio frequency (RF) signals. The bandpass filter, VGA, and ADC of a receive channel may be collectively referred to as a baseband chain or baseband filter chain. Further, the bandpass filter and VGA may be collectively referred to as an IF amplifier (IFA).

The receive channels 1320 are coupled to a digital front end (DFE) and Digital Signal Processor (DSP) system module 1350. The DFE and DSP system module may also be coupled to the control (CNTL) module 1340 to complete the function of the radar module in both functional and test modes and external data communication.

A serial peripheral interface (SPI) 1341 may provide an interface for communication with the processing unit located in another IC. For example, the processing unit may use the SPI 1341 to send control information, e.g., timing and frequencies of chirps, output power level, triggering of monitoring functions, etc., to the DFE and DSP System module. The radar SOC 1300 may use the SPI 1341, for example, to send test data to the processing unit.

The control module 1340 and DFE and DSP System module 1350 may include functionality to control the operation of the radar SOC 1300 in normal mode and in test mode.

A 10 GHz or higher frequency modulation synthesizer (FM-Synth) module 1330 generates the RF signals that are then multiply by four and provided to the transmitter channels. The programmable timing engine 1331 includes functionality to receive chirp parameter values for a sequence of chirps in a radar frame from the control module 1340 and to generate chirp control signals that control the transmission and reception of the chirps in a frame based on the parameter values. The chirp parameters are defined by the radar system architecture and may include, for example, a transmitter enable parameter for indicating which transmitters to enable, a chirp frequency start value, a chirp frequency slope, a chirp duration, indicators of when the transmit channels should transmit and when the DFE output digital should be collected for further radar processing, etc. One or more of these parameters may be programmable.

The radio frequency synthesizer (SYNTH) 1332 includes functionality to generate FMCW (frequency modulated continuous wave) signals for transmission based on chirp control signals from the timing engine 1331. In some embodiments, the SYNTH 1332 may include a phase locked loop (APLL) with a voltage controlled oscillator (XO).

The clock multiplier 1333 increases the frequency of the transmission signal (LO signal) to the LO frequency of the mixers 1322. The clean-up PLL (phase locked loop) operates to increase the frequency of the signal of an external low frequency reference clock (not shown) to the frequency of the SYNTH 1332 and to filter the reference clock phase noise out of the clock signal.

The clock multiplier 1333, synthesizer 1332, timing generator 1331, and clean up PLL are an example of transmission generation circuitry. The transmission generation circuitry generates a radio frequency (RF) signal as input to the transmit channels and as input to the mixers in the receive channels via the clock multiplier. The output of the transmission generation circuitry may be referred to as the LO (local oscillator) signal or the FMCW signal.

The CNTL circuitry 1340 may include one or more temperature sensors and various RF/analog measurement components.

Figure 14:
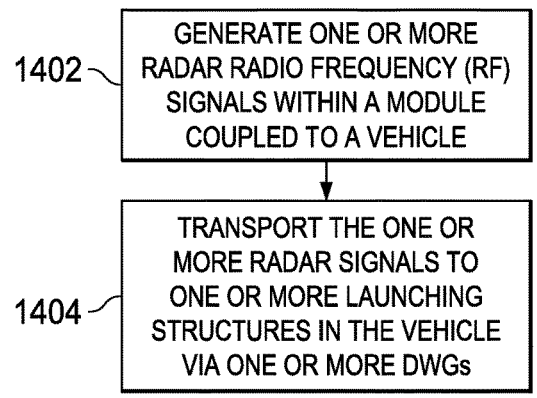
FIG. 14 is a flow chart illustrating distribution of radar signals within a vehicle.

FIG. 14 is a flow chart illustrating distribution of radar signals within a vehicle. The vehicle may be an automobile, truck, or other motorized or human powered vehicle. As described in more detail above, one or more radar signals may be generated 1402 in a radar module, such as module 1300 of FIG. 13.

Radar signals may be transported 1404 between various launching structures and ports on the radar module using DWG segments. As described above in more detail, various couplers and splitters may be used to combine and/or separate signals on the various DWG segments.

Other Embodiments

While the invention has been described with reference to illustrative embodiments, this description is not intended to be construed in a limiting sense. Various other embodiments of the invention will be apparent to persons skilled in the art upon reference to this description. For example, while a horn antenna was illustrated herein, various configurations of dipole and patch antennas, Vivaldi, or other known or later developed launching structures may be used to launch and receive radar signals through body parts of a vehicle.

While a dielectric waveguide has been described herein, another embodiment may use a metallic or non-metallic conductive material to form the top, bottom, and sidewalls of the wave guide, such as: a conductive polymer formed by ionic doping, carbon and graphite based compounds, conductive oxides, etc., for example.

A DWG stub and socket assembly may be fabricated onto a surface of a substrate using an inkjet printing process or other 3D printing process, for example.

While waveguides with polymer dielectric cores have been described herein, other embodiments may use other materials for the dielectric core, such as ceramics, glass, etc., for example.

While dielectric cores with a rectangular cross section are described herein, other embodiments may be easily implemented using the printing processes described herein. For example, the dielectric core may have a cross section that is rectangular, square, trapezoidal, cylindrical, oval, or many other selected geometries. Furthermore, the cross section of a dielectric core may change along the length of a waveguide in order to adjust impedance, produce transmission mode reshaping, etc., for example.

The dielectric core of the conductive waveguide may be selected from a range of approximately 2.4-12, for example. These values are for commonly available dielectric materials. Dielectric materials having higher or lower values may be used when they become available.

While sub-terahertz signals in the range of 70-100 GHz were discussed herein, DWGs and systems for distributing higher or lower frequency signals may be implemented using the principles described herein by adjusting the physical size of the DWG core accordingly.

While two example connectors were described herein, other configurations of connectors that are now known or later developed may be used to facilitate distribution of radar signals within a vehicle.

While automobiles and trucks were discussed above, embodiments of the disclosure are not limited autos and trucks. Any type of vehicle that may benefit for awareness of nearby objects may benefit from an embodiment of the disclosure. For example, robots, manufacturing and assembly devices, bicycles, etc. may all be regarded as "vehicles" and make use of an embodiment of the disclosure. Similarly, vehicles for movement of a mobility impaired person, such as a wheel chair or scooter, may benefit from an embodiment of the disclosure. Similarly, a "vehicle" to be used by a blind person for walking assistance may also benefit from an embodiment of the disclosure.

Certain terms are used throughout the description and the claims to refer to particular system components. As one skilled in the art will appreciate, components in digital systems may be referred to by different names and/or may be combined in ways not shown herein without departing from the described functionality. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" and derivatives thereof are intended to mean an indirect, direct, optical, and/or wireless electrical connection. Thus, if a first device couples to a second device, that connection may be through a direct electrical connection, through an indirect electrical connection via other devices and connections, through an optical electrical connection, and/or through a wireless electrical connection.

Although method steps may be presented and described herein in a sequential fashion, one or more of the steps shown and described may be omitted, repeated, performed concurrently, and/or performed in a different order than the order shown in the figures and/or described herein. Accordingly, embodiments of the invention should not be considered limited to the specific ordering of steps shown in the figures and/or described herein.

It is therefore contemplated that the appended claims will cover any such modifications of the embodiments as fall within the true scope and spirit of the invention.

What is claimed is:

1. A vehicle comprising:
 a vehicle body having a body part;
 a radar module having a port with a port antenna;
 a radar antenna proximate to the body part of the vehicle body, wherein the radar antenna is located within the vehicle body; and
 a flexible dielectric waveguide (DWG) having a dielectric core member surrounded by a second dielectric layer, the DWG coupled between the radar antenna and the port antenna of the radar module.

2. The vehicle of claim 1, wherein the radar antenna is a first radar antenna, the port is a first port, the body part is a first body part, and the DWG is a first DWG; and further comprising:
 a second radar antenna positioned adjacent a second body part of the vehicle body; and
 a second flexible DWG coupled between the second radar antenna and a second port of the radar module.

3. The vehicle of claim 1, in which the radar antenna is in contact with a surface of the body part, wherein the surface of the body part forms a portion of an outer surface of the vehicle.

4. The vehicle of claim 1, in which the radar antenna is spaced apart from a surface of the body part.

5. The vehicle of claim 1, in which the radar antenna is a horn antenna.

6. The vehicle of claim 1, in which the radar antenna is Vivaldi antenna.

7. The vehicle of claim 1, in which the radar antenna is a dipole antenna.

8. The vehicle of claim 1, in which the body part is a bumper.

9. The vehicle of claim 1, in which the body part is a fender.

10. The vehicle of claim 1, wherein the radar module includes a second port having a second port antenna, in which the radar module is mounted such that a second port antenna is adjacent to a second body part.

11. The vehicle of claim 1, wherein the radar antenna is a first radar antenna, the body part is a first body part and the DWG has a first DWG segment and a flexible second DWG segment; further comprising:
 a toroidal splitter having a splitter input port, a first splitter output port, and a second splitter output port, wherein the first DWG segment is coupled between the port of the radar module and the splitter input port, the flexible second DWG segment is coupled between the first splitter output port and the first antenna;
 a second radar antenna; and
 a flexible third DWG segment coupled between the second splitter output port and the second antenna.

12. The vehicle of claim 1, wherein the radar antenna is a first radar antenna, the body part is a first body part and the DWG has a first DWG segment and a flexible second DWG segment; further comprising:

a dielectric circulatory coupler having a first coupler input port, a second coupler input port, and a coupler output port, wherein the first DWG segment is coupled between the port of the radar module and the coupler output port, the flexible second DWG segment is coupled between the first coupler input port and the first antenna;

a second radar antenna; and a flexible third DWG segment coupled between the second coupler input port and the second antenna.

13. A method for distributing radar signals in a vehicle, the method comprising:

generating a radar signal within a radar module coupled to the vehicle; and transmitting the radar signal directly over a flexible dielectric waveguide (DWG) from a port antenna on the radar module to an input of a radar antenna proximate to a body part of the vehicle, wherein the DWG has a dielectric core member surrounded by second dielectric layer and wherein the radar antenna is located within a body of the vehicle.

14. The method of claim 13, further including transmitting multiple radar signals from one or more ports of the radar module to a plurality of radar antennas adjacent one or more body parts of the vehicle via a plurality of DWGs.

15. The method of claim 14, further including combining two or more radar signals coupled to two or more ports of the radar module using a coupler.

16. The method of claim 14, further including combining two or more radar signals coupled to two or more radar antennas using a coupler.

17. The method of claim 13, wherein the body part is a first body part; and further including transmitting a second radar signal from a second port on the radar module through a second body part located adjacent the radar module.

18. A vehicle comprising:

a vehicle body having a first body part on a first portion of the vehicle and a second body part on a second portion of the vehicle opposite the first portion;

a radar module having a first port with a first port antenna and a second port with a second port antenna;

a first radar antenna proximate to the first body part of the vehicle body;

a second radar antenna proximate the second body part of the vehicle body;

a flexible first dielectric waveguide (DWG) having a dielectric core member surrounded by a second dielectric layer, the first DWG coupled between the first radar antenna and the first port antenna of the radar module; and a flexible second DWG coupled between the second radar antenna and the second port antenna of the radar module.

19. The vehicle of claim 18, wherein the first portion of the vehicle is a front portion of the vehicle and the second portion of the vehicle is on a rear portion of the vehicle.

20. The vehicle of claim 18, wherein the first portion of the vehicle is a driver side portion of the vehicle and the second portion of the vehicle is a passenger side portion of the vehicle.

* * * * *